United States Patent
Daniels (10) Patent No.: US 12,319,303 B1
(45) Date of Patent: Jun. 3, 2025

(54) CONTEXT DRIVEN STATE MACHINE SYSTEM FOR ALERT GENERATION

(71) Applicant: Lytx, Inc., San Diego, CA (US)

(72) Inventor: Jesse Daniels, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 80 days.

(21) Appl. No.: 17/410,002

(22) Filed: Aug. 24, 2021

(51) Int. Cl.
| | |
|---|---|
| *B60W 50/14* | (2020.01) |
| *B60W 40/04* | (2006.01) |
| *B60W 40/06* | (2012.01) |
| *B60W 40/08* | (2012.01) |
| *G06V 20/56* | (2022.01) |
| *G06V 20/59* | (2022.01) |
| *G07C 5/08* | (2006.01) |
| *G08G 1/0967* | (2006.01) |

(52) U.S. Cl.
CPC ............ *B60W 50/14* (2013.01); *B60W 40/04* (2013.01); *B60W 40/06* (2013.01); *B60W 40/08* (2013.01); *G06V 20/56* (2022.01); *G06V 20/597* (2022.01); *G07C 5/085* (2013.01); *G08G 1/0967* (2013.01); *B60W 2040/0827* (2013.01); *B60W 2040/0845* (2013.01); *B60W 2420/40* (2013.01); *B60W 2540/229* (2020.02); *B60W 2552/15* (2020.02); *B60W 2555/60* (2020.02); *B60W 2556/10* (2020.02)

(58) Field of Classification Search
CPC ...... B60W 50/14; B60W 40/04; B60W 40/06; B60W 40/08; B60W 2556/10; B60W 2540/229; B60W 2555/60; B60W 2552/15; B60W 2040/0827; B60W 2040/0845; B60W 2420/40; G06V 20/597; G06V 20/56; G07C 5/085; G08G 1/0967
USPC ................................ 348/148; 701/1, 23, 301
See application file for complete search history.

(56) References Cited

U.S. PATENT DOCUMENTS

| | | | | |
|---|---|---|---|---|
| 7,212,901 | B2 * | 5/2007 | Sadano | B60T 8/17557 348/148 |
| 8,483,904 | B2 * | 7/2013 | Viggers | B60W 40/09 348/148 |
| 10,311,749 | B1 * | 6/2019 | Kypri | G09B 19/162 |
| 10,468,135 | B2 * | 11/2019 | Lynn | H04N 9/87 |
| 11,615,654 | B1 * | 3/2023 | Krotosky | G07C 5/0808 701/31.4 |
| 2010/0123779 | A1 * | 5/2010 | Snyder | G07C 5/0866 386/241 |
| 2014/0049646 | A1 * | 2/2014 | Nix | B60W 50/0098 348/148 |
| 2014/0111647 | A1 * | 4/2014 | Atsmon | G08G 1/14 348/148 |

(Continued)

*Primary Examiner* — Christopher S Kelley
*Assistant Examiner* — Asmamaw G Tarko
(74) *Attorney, Agent, or Firm* — Van Pelt, Yi & James LLP (57) ABSTRACT

A system for context based alerts includes an interface and a processor. The interface is configured to receive driver context data and surrounding context data. the processor is configured to determine a current state using alert context patterns and the driver context data and the surrounding context data, where the alert context patterns are determined based at least in part on correlation between events in historic event data and context data, and where the context data comprises historic driver context data and historic surrounding context data; and determine whether to alert a driver based at least in part on the current state.

22 Claims, 10 Drawing Sheets

(56) References Cited

U.S. PATENT DOCUMENTS

| | | | | |
|---|---|---|---|---|
| 2014/0226010 | A1* | 8/2014 | Molin | H04N 7/01 340/576 |
| 2015/0175168 | A1* | 6/2015 | Hoye | G07C 5/008 434/64 |
| 2016/0046298 | A1* | 2/2016 | DeRuyck | G06V 20/597 340/576 |
| 2019/0228595 | A1* | 7/2019 | Mallela | G07C 5/0841 |
| 2019/0332106 | A1* | 10/2019 | Belloni Mourao | B60W 40/08 |
| 2020/0090226 | A1* | 3/2020 | Garden | G06V 20/56 |
| 2020/0410368 | A1* | 12/2020 | Hasegawa | G07C 5/0816 |
| 2021/0197720 | A1* | 7/2021 | Houston | G06N 3/045 |
| 2021/0221370 | A1* | 7/2021 | Lanfranco | G06V 20/584 |
| 2021/0394775 | A1* | 12/2021 | Julian | G08G 1/164 |
| 2022/0126878 | A1* | 4/2022 | Moustafa | B60W 50/0098 |
| 2022/0371580 | A1* | 11/2022 | Kusumoto | B60W 10/20 |
| 2022/0371601 | A1* | 11/2022 | Kuwahara | B60W 50/14 |

\* cited by examiner

CONTEXT DRIVEN STATE MACHINE SYSTEM FOR ALERT GENERATION

BACKGROUND OF THE INVENTION

Modern transportation vehicles (e.g., airplanes, boats, trains, cars, trucks, etc.) often include a vehicle event recorder in order to support driver safety, operational safety, and operational productivity. A vehicle event recorder typically includes a set of sensors (e.g., cameras, video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events (e.g., distractions, hard braking, lane charge, pedestrians, rain, accidents, risky maneuvers, unexpected locations, proximity risks, vehicle malfunctions, improper driver behavior, etc.). However, the risk associated with a particular driver behavior (e.g. vehicle speed, lane departure, etc.) may be higher or lower depending on the surrounding context of the driver and vehicle (e.g., residential or construction area vs. highway, weather, in-vehicle distractions, etc.). This creates a problem for generating appropriate alerts as the context is typically not taken into account by an alert system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for generating context-based alerts comprising an interface configured to receive driver context data and surrounding context data and a processor configured to determine a current state and whether to alert a driver based at least in part on the current state is disclosed. The processor is configured to determine a current state using alert context patterns, driver context data, and the surrounding context data. The alert context patterns are determined based at least in part on correlation between events in historic event data and context data, where the context data comprises historic driver context data and historic surrounding context data. The processor is further configured to determine whether to alert a driver based at least in part on the current state.

The system for generating context-based alerts receives both real-time context data and historical context data. Both real-time and historical context data comprise both driver context data (e.g., driver distraction, hard brake, lane departure events etc.) and surrounding context data (e.g., weather, high accident locations, terrain, traffic density, pedestrian events etc.) The system for generating context-based alerts determines the occurrence of incidents such as high-risk events, driver compliance, or anomalous events (e.g., distractions, hard braking, lane charge, pedestrians, rain, accidents, risky maneuvers, unexpected locations, proximity risks, vehicle malfunctions, improper driver behavior, etc.). Because the risk associated with a particular driver behavior (e.g., vehicle speed, lane departure, etc.) may be higher or lower depending on the surrounding context of the driver and vehicle (e.g., residential or construction area vs. highway, weather, in-vehicle distractions, roll-over stability etc.), the system uses both real-time context data and historical context data to account for these factors in its decision of whether to alert the driver.

Alert context patterns are determined based at least in part on correlation between events in historic driver context data and historic surrounding context data. In some embodiments, a particular alert context pattern is learned by reverse correlating high risk or anomalous events within the historical driver and surrounding context dataset. For example, because a hard-braking event often precedes an accident or near collision, the historic driver context data can be searched for every high-risk hard-braking event. Then for every hard-braking event, the preceding epoch of historic surrounding context data and historic driver context data is stored. This collection of preceding epochs to a high-risk event can be averaged to form an alert context pattern that describes the typical context preceding a high-risk hard-braking event. The system for generating context-based alerts can then monitor the real-time driver context and real-time surrounding context for a pattern that is similar to the alert context pattern indicating that in such a context, a high-risk hard brake event is likely. In some embodiments, the system for generating context-based alerts comprises a state machine that indicates the current alert state of the system (e.g., clear, warning, alert) and the probability of transitioning from the current state to a future alert state (e.g., from a 'warning' state to a 'clear' state).

Figure 1:
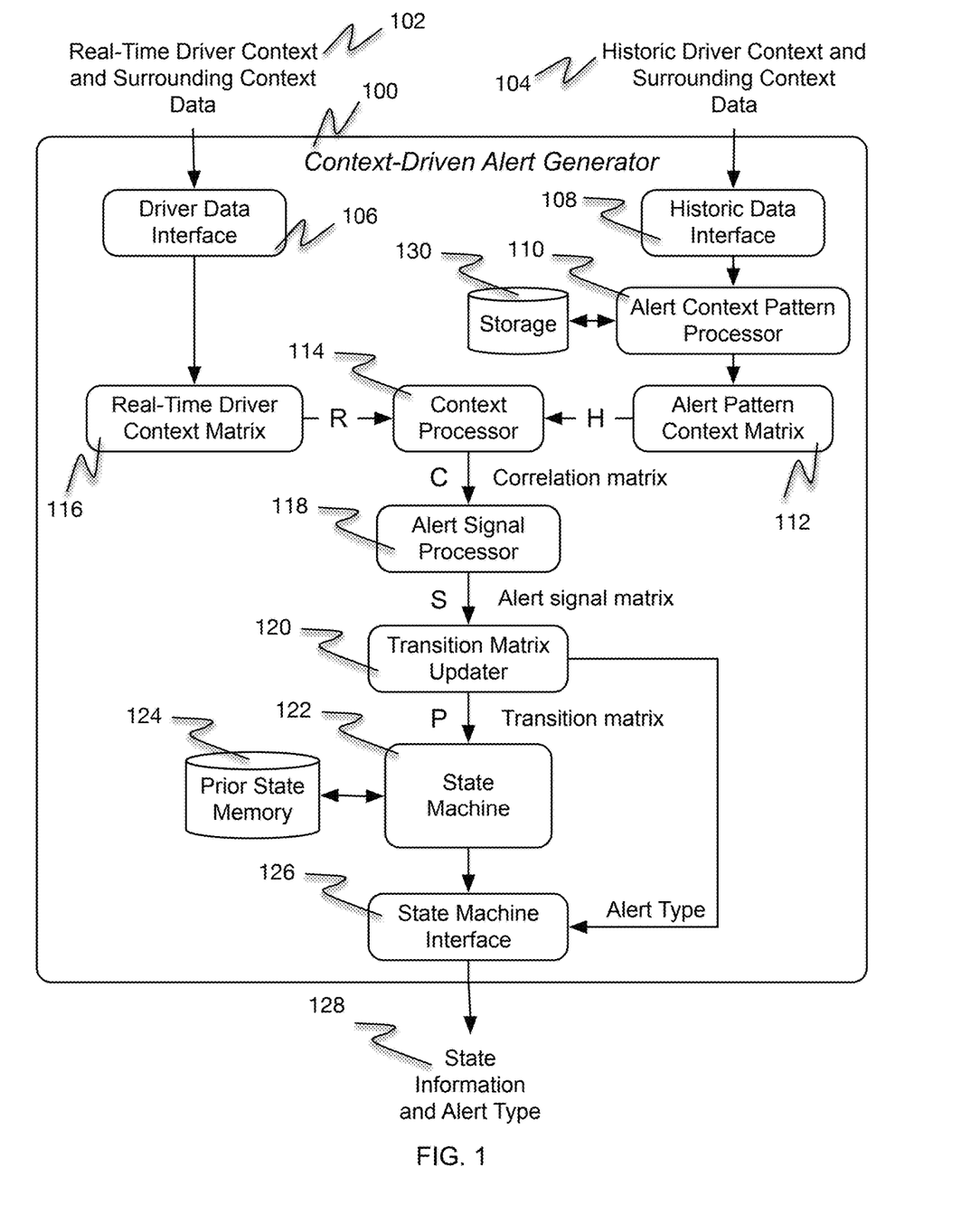
FIG. 1 is a block diagram illustrating an embodiment of a context-driven alert generator.

FIG. 1 is a block diagram illustrating an embodiment of a context-driven alert generator. In the example shown, context-driven alert generator 100 comprises driver data interface 106, historic data interface 108, alert context pattern processor 110, storage 130, alert pattern context matrix 112, real-time driver context matrix 116, context processor 114, alert signal processor 118, transition matrix updater 120, state machine 122, prior state memory 124, and state machine interface 126. Context-driven alert generator 100 receives real-time driver context and surrounding context data 102 and historic driver context and surrounding context data 104 and outputs state information 128 about the alert state of the system. In some embodiments, the historic surrounding context data includes historic weather data. In some embodiments, the historic surrounding context data includes historic accident data and/or historic traffic data.

For example, real-time driver context and surrounding context data 102 indicates that the driver is currently in a construction zone with pedestrians, in high traffic density, and with low visibility due to rain and the historic driver context and surrounding context data 104 indicates that in the past, such a context has led to near collisions. As a result, context-driven alert generator 100 outputs state information 128 indicating a warning to reduce speed in order to avoid the need for hard-braking.

Driver data interface 106 receives real-time driver context and surrounding context data 102 and sends it to real-time driver context matrix 116. Real-time driver context matrix 116 processes real-time driver context and surrounding context data 102 into a matrix and outputs the real-time driver context information (e.g., driver context information expressed as a matrix R) to context processor 114. In some embodiments, real-time driver context matrix R includes information regarding driver events and the context in which they occurred. In various embodiments, the driver events comprise one or more of the following: distraction, hard-brake, lane-change, pedestrian, rain, sun, time of day, or any other appropriate context. In various embodiments, the driver events comprise rows, columns, or any other appropriate dimension in real-time driver context matrix R. In some embodiments real-time driver context matrix R is a Boolean matrix with one dimension indicating driver events, a second dimension indicating the time points in the past when the events occurred and the Boolean elements indicating the presence of the event at a particular point in time.

Historic data interface 108 receives historic driver context and surrounding context data 104 and sends it to alert context pattern processor 110. Alert context pattern processor 110 processes both the incoming historic driver context and surrounding context data 104 and the data stored in storage 130 into a specific format (e.g., a matrix) and sends the output to alert pattern context matrix 112. Alert pattern context matrix 112 processes the output of alert context pattern processor into a matrix and outputs the alert pattern context matrix H to context processor 114. In some embodiments, alert pattern context matrix H includes information regarding driver events and the context in which they occurred. In various embodiments, the driver events comprise one or more of the following: distraction, hard-brake, lane-change, pedestrian, rain, sun, time of day, or any other appropriate context. In various embodiments, the driver events comprise rows, columns, or any other appropriate dimension in alert pattern context matrix H. In some embodiments, alert pattern context matrix H is a 3D Boolean matrix with one dimension indicating driver events, a second dimension indicating the time points in the past when the events occurred, and a third dimension indicating alert context types, and Boolean elements indicating the presence of the event at a particular point in time for a particular alert type. In some embodiments, alert pattern context matrix H comprises a 3D alert pattern context matrix.

In some embodiments, matching/associating historical context risk with current context risk profile is used to model or generate a way to determine risk from current circumstances/sensor readings.

In some embodiments, context processor 114 receives driver context matrix R and alert pattern context matrix H and outputs correlation matrix C. In some embodiments, matrix C is normalized by the magnitude $$|H||R|\left(\text{e.g., } C^* = \frac{H^T R}{|H||R|}\right)$$

or any other appropriate norm. In various embodiments, matrix C contains information about the degree of similarity between driver context matrix R and alert pattern context matrix H. In some embodiments, correlation matrix C is a 3D matrix with the first and second dimensions containing the normalized matrix product $H^T R$ and the third dimension indexing each alert context type.

Alert signal processor 118 receives correlation matrix C and outputs alert signal matrix S. In some embodiments, alert signal matrix S is a 1×N matrix where N is the number of alert signal types in alert pattern context matrix H and the elements of S represent the probability of a match between the real-time driver context matrix R and a particular alert context type. In some embodiments, the probability of a match is derived from the sum of the diagonal elements of the normalized correlation matrix C*.

In some embodiments, a degree of match between current context and historical risk matrix defines transition probabilities for a state machine.

In some embodiments, transition matrix updater 120 receives alert signal matrix S and outputs transition matrix P to state machine 122 and alert type tag to state machine interface 126. In some embodiments, transition matrix P is a N×N matrix representing the transition probabilities for a N-state state machine where each state N represents a message or stage of alert of the system. In some embodiments, transition matrix P is a 3×3 matrix representing the transition probabilities for a 3-state (e.g., 'clear', 'warning', 'alert') state machine. In some embodiments, the elements of transition matrix P representing transitions to a warning or alert state are at or near 1 when the alert signal matrix S indicates a high probability of a match to an alert signal type. In some embodiments, the elements of transition matrix P representing transitions to the clear state are at or near 1 when the alert signal matrix S indicates a low probability of a match to an alert signal type. In various embodiments, the alert type tag indicates which alert types were matched to the real-time driver context data.

State machine 122 receives transition matrix P and prior state memory 124 and updates the state of the state machine and outputs the new state to state machine interface 126 and updates and prior state memory 124. State machine interface 126 outputs state information 128.

In some embodiments, determining a current state is based at least in part on a state machine, wherein the state machine transitions are determined based at least in part on the alert context patterns and real-time driver context. For example, alert context pattern matrix H contains a signature for a driver smoking without a seatbelt while the vehicle is moving and the real-time driver context matrix R contains a signature for a driver smoking without a seatbelt in a non-moving vehicle. For example, the context processor 114 outputs a correlation matrix C to the alert signal processor 118 which passes an alert signal matrix S to the transition matrix updater 120. The updated state machine transition matrix P is passed to the state machine 122 and the state machine evolves to a non-alert state due to the non-moving vehicle context pattern.

In some embodiments, the state machine transitions are based at least in part on processing of a correlation matrix derived by multiplying a real-time driver context matrix and a historical data matrix. For example, context processor 114 receives real-time driver context matrix R and historical context matrix H and computes the matrix product $H^T R$. Matrix product $H^T R$ is output as a normalized correlation matrix C* which is processed by alert signal processor 118 and transition matrix updater 120 which outputs an updated state machine transition matrix P to the state machine 122.

Figure 2:
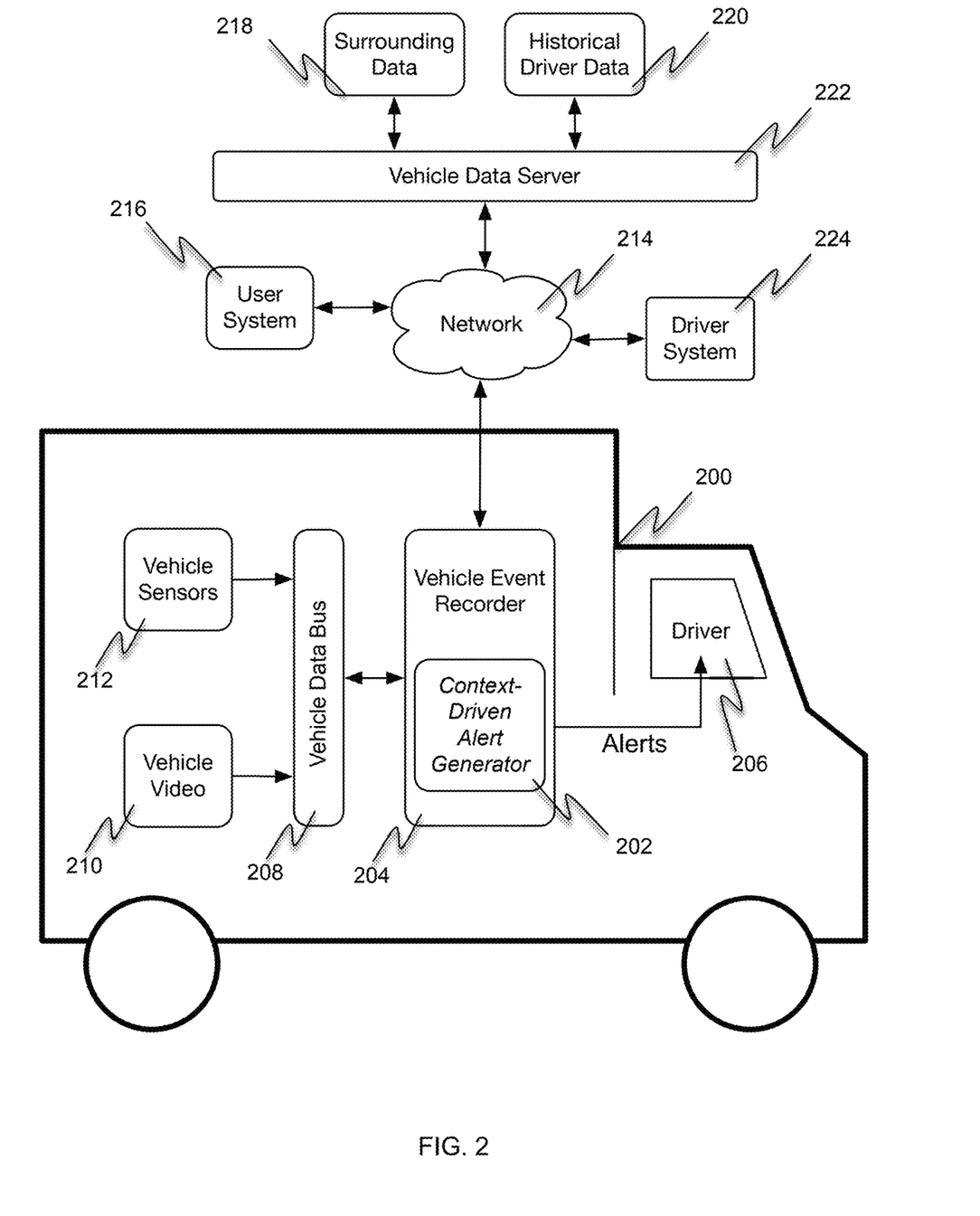
FIG. 2 is a block diagram illustrating an embodiment of a context-driven state machine system for alert generation.

FIG. 2 is a block diagram illustrating an embodiment of a context-driven state machine system for alert generation. In some embodiments, vehicle event recorder 100 of FIG. 1 is used to implement vehicle event recorder 204 of FIG. 2. In the example shown, vehicle 200 comprises vehicle event recorder 204, context-driven alert generator 202, vehicle data bus 208, vehicle video 210, vehicle sensors 212, and driver 206. Vehicle event recorder 204 communicates to driver system 224, user system 216, and vehicle data server 222 via network 214. Vehicle data server 222 receives surrounding data 218 and historical driver data 220. Vehicle event recorder 204 receives real-time driver context data from vehicle video 210 vehicle sensors 212 via vehicle data bus 208 as well as real-time surrounding driver data 218 via network 214 and processes the real-time data and historical driver data 220 with context-driven alert generator 202 to determine if an alert is to be sent to driver 206. For example, real-time driver context and real-time surrounding context data indicates that the driver is currently in a construction zone with pedestrians and high traffic density, and the historical driver context data 220 indicates that in the past, such a context has led to near collisions. As a result, context-driven alert generator 202 outputs state information to driver 206 indicating a warning to reduce speed in order to avoid the need for hard-braking.

Figure 3:
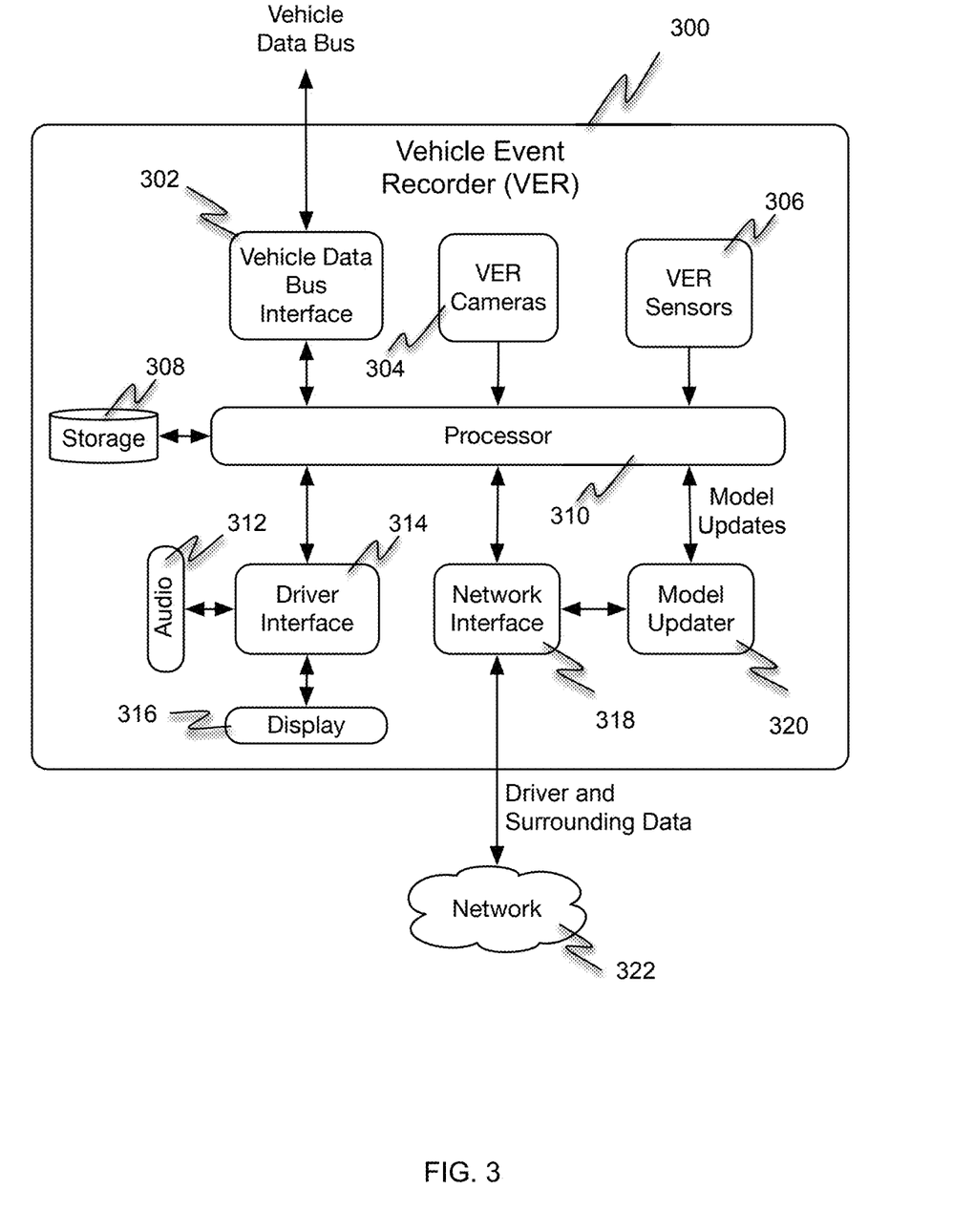
FIG. 3 is a block diagram illustrating an embodiment of a vehicle event recorder (VER).

FIG. 3 is a block diagram illustrating an embodiment of a vehicle event recorder (VER). In some embodiments, vehicle event recorder 300 of FIG. 3 is used to implement vehicle event recorder 204 of FIG. 2. In the example shown, vehicle event recorder 300 comprises processor 310, vehicle data bus interface 302, VER cameras 304, VER sensors 306, storage 308, driver interface 314, audio 312, display 316, network interface 318, and model updater 320. Network interface 318 receives information about real-time driver context and surrounding context data, and historic driver context and historic surrounding context data via network 322. Processor 310 receives data about the vehicle and its present environment through VER cameras 304, VER sensors 306, and vehicle data bus interface 302. Processor 310 receives data about real-time driver context and surrounding context data, and historic driver context and surrounding context data through network interface 318.

Processor 310 communicates with the driver via driver interface 314 which sends and receives messages from audio 312 and display 316. For example, the driver receives a warning message from audio 312 and display 316 indicating that speed should be reduced because vehicle is in a construction zone. Processor 310 sends and receives data from storage 308. Processor 310 updates its data models via model updater 320. For example, processor 310 updates a context-driven alert model to include a new alert context type for driving in a construction zone.

Processor 310 receives data about the vehicle and its present environment and processes the data using models for operation, activity, and context-driven alerts. For example, processor uses its operational model to determine that the vehicle is stopped for an unloading operation (vs. parked) and uses its activity model to determine that there are several people near the vehicle and uses its context-driven alert model to determine that there may be unauthorized people in the vehicle with incorrect packages being off loaded.

Figure 4:
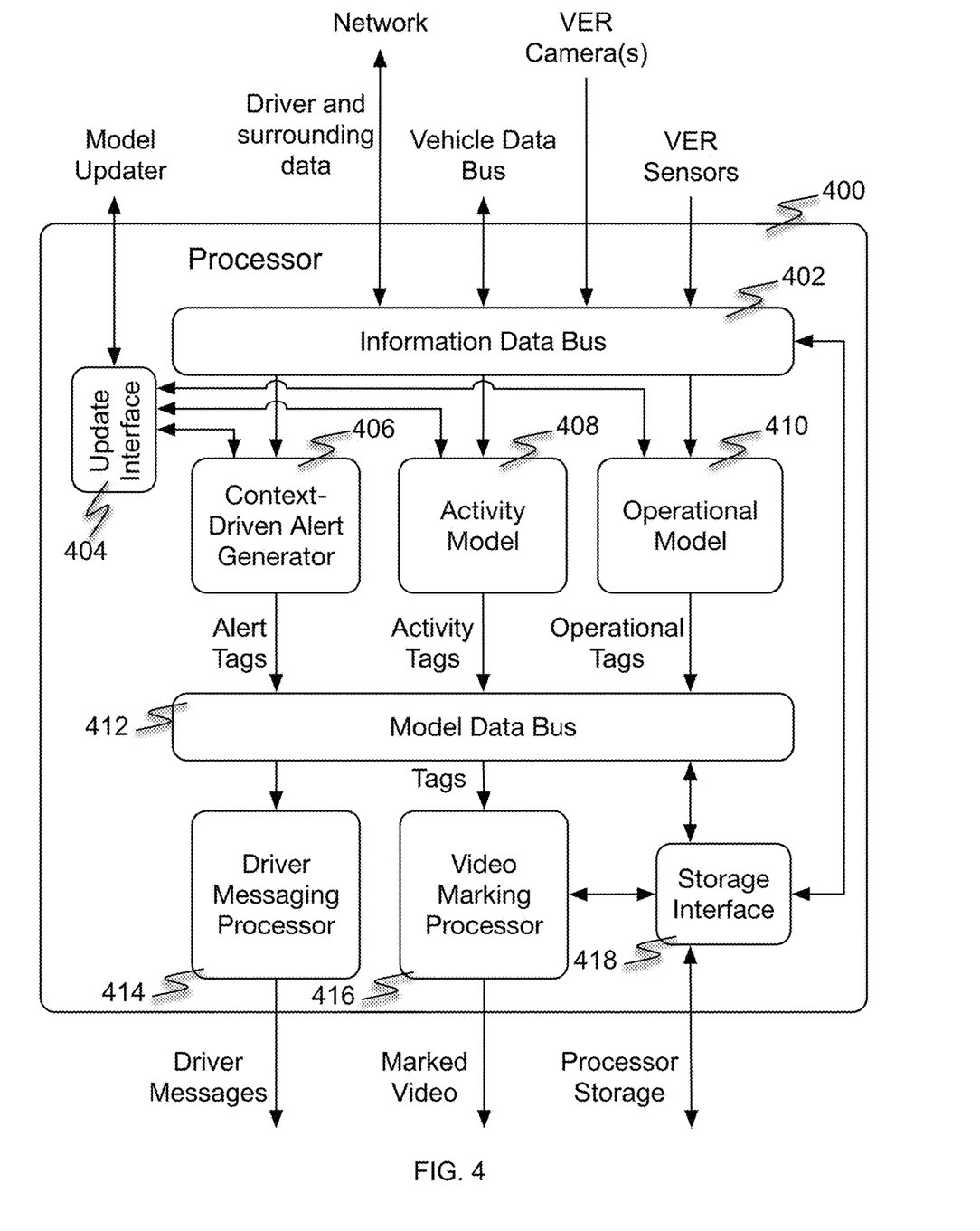
FIG. 4 is a block diagram illustrating an embodiment of a processor for processing real-time and historical context data for alert generation.

FIG. 4 is a block diagram illustrating an embodiment of a processor for processing real-time and historical context data for alert generation. In some embodiments, processor 400 of FIG. 4 is used to implement processor 310 of FIG. 3. In the example shown, processor 400 comprises information data bus 402, update interface 404, context-driven alert generator 406, activity model 408, operational model 410, model data bus 412, storage interface 418, video marking processor 416, and driver messaging processor 414. In some embodiments, context-driven alert generator 100 of FIG. 1 is used to implement context-driven alert generator 406 of FIG. 4. In some embodiments, processor 400 is further configured to determine a state machine based at least in part on the alert context patterns. For example, context-driven alert generator 406 receives alert context pattern matrix via information data bus 402 and updates the state machine within context-driven alert generator 406. In some embodiments, the state machine within context-driven alert generator 406 is state machine 122 of FIG. 1.

Information data bus 402 receives driver context data and surrounding context data from the network, vehicle data, VER camera data, and VER sensor data. Context-driven alert generator 406, activity model 408, operational model 410, process the data on information data bus 402 and transmit alert tags (e.g., distraction), activity tags (e.g., pedestrian movements), and operational tags (e.g., unloading) respectively to model data bus 412.

Video marking processor 416 receives tags from model data bus 412 and determines whether the current video epoch should be marked as an area of interest for further review or storage. For example, operational tags indicating unloading at an unscheduled location may warrant review of vehicle video streams for potential unauthorized activities or theft. Driver messaging processor 414 receives tags from model data bus 412 and determines whether a message should be sent to the driver. For example, context-driven alert model 406 receives data from information data bus 402 and determines there is high risk of collision due to the vehicle following too close to a forward vehicle that is in front of the vehicle the vehicle event recorder is in. Driver messaging processor 414 receives this high-risk alert tag and notifies the driver to not follow as close to the forward vehicle. Model update interface 404 updates (e.g., as provided from the vehicle data server) all models for optimal processing based on machine learning or instructor input. For example, context-driven alert model 406 may be updated based on a prior incident data such that similar incidents in the future can be automatically identified. Storage interface 418 stores data from information data bus 402 and model data bus 412 as needed by the video marking processor 416.

In some embodiments, the historic driver context data and the context data are based on data from an interior vehicle camera. For example, information data bus 402 receives input from interior VER camera(s). Information data bus 402 then sends data from VER camera(s) to be processed by context alert generator 406, activity model 408, and operational model 410.

In some embodiments, the data from the interior vehicle camera is input to distraction models to generate distraction data. In various embodiments, the distraction data comprises one or more of: a cell distraction, an eating distraction, a drinking distraction, a smoking distraction, a seat belt distraction (e.g., unbelted seat belt), an obstruction distraction, a motion distraction, an inattentiveness distraction, a lane departure distraction, a tailgating distraction, a drowsy distraction, a potential collision, and/or any other appropriate distraction. In some embodiments, the distraction data is generated using the models on a VER and used to trigger an alert. In some embodiments, activity model 408 uses a vision system to analyze VER camera data to determine if a driver is distracted using a cell phone and outputs data stream tags that locate the times the driver is using a cell phone within the VER camera data.

In some embodiments, the alerts are generated as governed by alerting rules. In some embodiments, alerting rules that govern the alerting strategy for the vision-based distractions are parameterized using the following settings: 1) a confidence percent—a threshold (as a percentage) for the prediction probability value, above which a distraction is considered to be detected for alerting; 2) delay seconds—a number of seconds of the distraction required to be detected in order to issue an initial alert; 3) repeat seconds—a number of seconds to wait before issuing a repeat alert if distraction continues after an initial alert; 4) maximum repeats—a number of repeat alerts after which further repeats are silenced, where the repeat count is reset when the distraction ceases (or the vehicle stops moving); 5) refractory seconds—a number of seconds after an alert (initial or repeat) is issued during which a new initial alert of the same alert_type cannot be issued; and/or 6) minimum speed—a minimum vehicle speed (e.g., in km/h) above which the vehicle is considered "moving. For example, alerting parameters in some cases are set as follows: a cell_phone detection probability is >0.9 confidence_percent for a 10 second delay; an alert is issued if repeated within after 60 seconds; and the vehicle is moving more than 5 kph; and where the maximum number of repeats of the alert is 5.

In some embodiments, historic surrounding context data and the surrounding context data are based on data from an exterior vehicle camera. For example, information data bus 402 receives input from an exterior vehicle camera via the vehicle data bus. Information data bus 402 then sends data from the vehicle data bus to be processed by context alert generator 406, activity model 408, and operational model 410. In some embodiments, the data from the exterior vehicle camera is input to vision systems to generate exterior context detected data. For example, data from an exterior vehicle camera is processed by vision systems in activity model 408, and operational model 410 to determine if there are pedestrians visible. In various embodiments, the exterior context detected data comprises one or more of: a detected traffic data, a detected traffic speed data, a detected curvy road data, a detected straight road data, a detected flat road data, a detected hilly road data, a detected incline road data, a detected decline road data, a detected traffic light data, a detected stop sign data, a detected pedestrian data, a detected cyclist data, a detected weather data, a detected lane departure data, a traffic density, a traffic speed and/or variability (e.g., stop and go), a time of day or night, a recent lane characterization (e.g., straight road, curvy road, etc.), a terrain characterization (e.g., flat, hilly, incline, decline, etc.), presence of traffic controls (e.g., stop lights), presence of pedestrians, presence of cyclists, risky areas (e.g., based on accident data), and/or any other appropriate exterior context data.

In various embodiments, context data comprises exterior context data and/or interior context data. In various embodiments, interior context data comprises one or more of the following: driver's hours of driving, presence of passenger, indication of driver drowsiness, lens obstruction (e.g., an indication that the driver is trying to hide behaviors, and/or any other appropriate interior context data.

In some embodiments, the event data are determined using a vehicle event recorder and/or vehicle event recorder sensors. For example, information data bus 402 receives input from VER sensors. Information data bus 402 then sends data from VER sensors to context alert generator 406, activity model 408, and operational model 410 to be processed. In various embodiments, the event data comprises one or more of: a hard braking event, an accelerometer event, a near collision event, a hard cornering event, a rollover stability event, an anti-lock braking event, an accident event, and/or any other appropriate event. For example, activity model 408 uses data from the VER sensors to determine if a driver braked unusually hard and output sensor data stream tags that mark all times the driver braked hard.

Model data bus 412 receives all data stream locations that were tagged by context-driven alert generator 406, activity model 408, and operational model 410 and outputs to video marking processor 416. Video marking processor 416 sends the annotated data through the network for off-line analysis and processing. Alert pattern context processor 110 of FIG. 1 receives the historical annotated data sent by video marking processor 416 via the network and determines from the historical data an alert pattern (e.g., a context matrix H) that describes a context for which a driver should be sent an alert. For example, video marking processor 416 sends tags indicating a hard braking event was preceded by a detection of pedestrians which was preceded by a driver using a cell phone. This historical data can be used to automatically learn an alert pattern for the context of pedestrians present while driver is using a cell phone based on the occurrence of an undesirable hard braking event. The next time the system detects pedestrians while the driver is using a cell phone, a driver alert can be generated to potentially avoid the need for a hard braking event.

Figure 5:
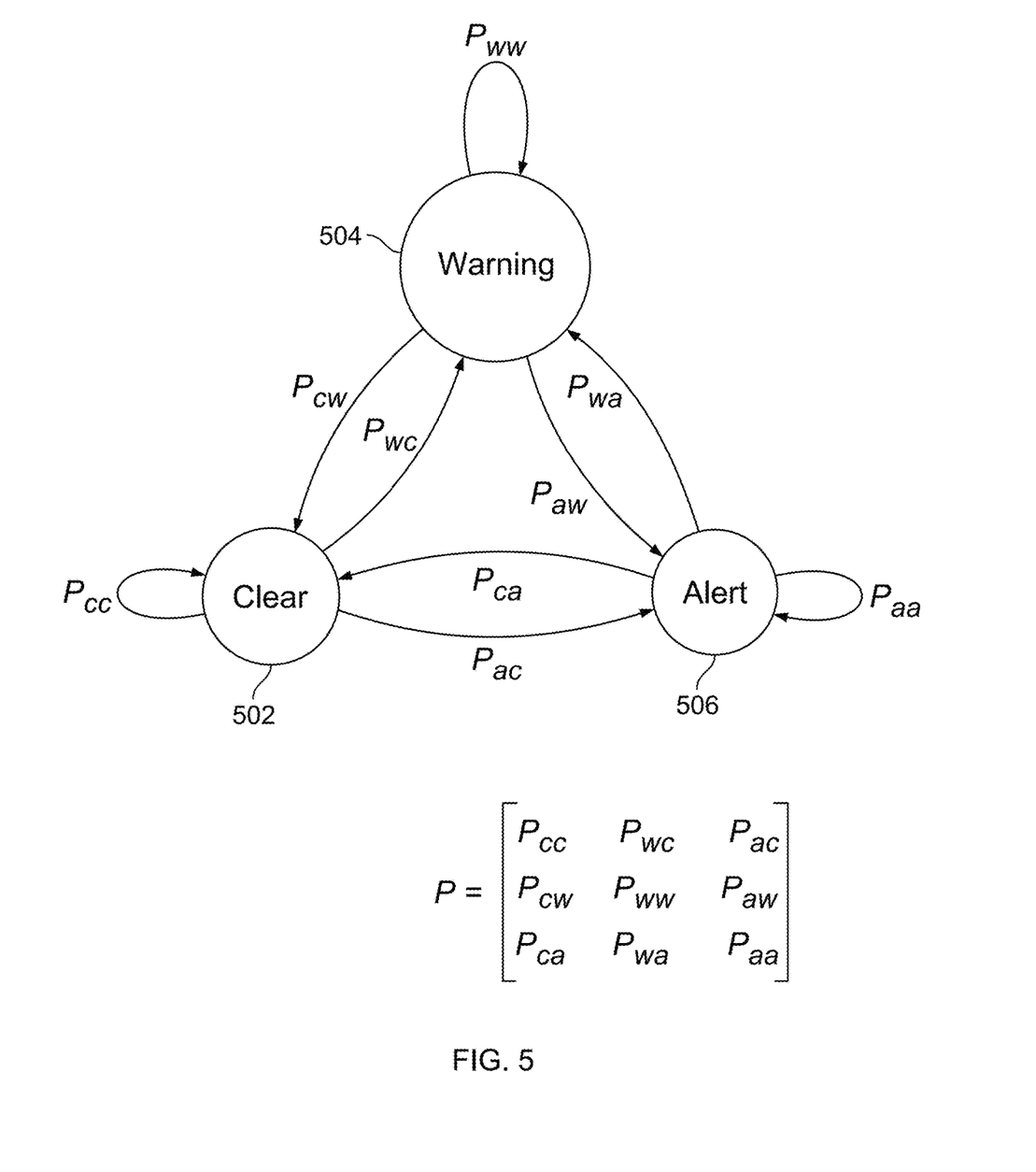
FIG. 5 shows an embodiment of a transition matrix P for a state machine.

FIG. 5 shows an embodiment of a transition matrix P for a state machine. In various embodiments, the state machine is state machine 122 of FIG. 1. In the example shown, the state machine comprises 3 states: clear state 502, warning state 504, and alert state 506. The transition matrix P is a matrix (e.g., a 3×3 matrix) representing the transition probabilities for the states in the state machine (e.g., the three states 'clear', 'warning', and 'alert'). In some embodiments, the elements of transition matrix P representing the probability of a transition to a warning or alert state (e.g., $P_{cw}$, $P_{ca}$) are at or near 1 when the alert signal matrix S indicates a high probability of a match to an alert signal type. In some embodiments, the elements of transition matrix P representing the probability of a transition to the clear state (e.g., $P_{wc}$, $P_{ac}$) are at or near 1 when the alert signal matrix S indicates a low probability of a match to an alert signal type. In some embodiments, transition matrix P is a N×N matrix representing the transition probabilities for a N-state state machine where each state N represents a message or stage of alert of the system.

In various embodiments, determining whether to alert the driver is based at least in part on time or frequency associated with the driver context data, the surrounding context data, the current state, and/or any other appropriate alert criterion. For example, the danger associated with a particular driver distraction event may be dependent on the surrounding context and the current state of alert. For example, a driver using a cell phone in a high traffic area after previously being warned may be alerted more frequently than a driver using a cell phone while driving on an open highway.

In some embodiments, determining whether to alert the driver is based at least in part on a client preference for alerts. For example, a client may specify that a seatbelt alert be suppressed when the driver is not wearing a seatbelt if the vehicle is stopped or a client may specify that a speed alert gets activated anytime the vehicle exceeds 55 mph.

In some embodiments, determining whether to alert the driver is based at least in part on a prior alert type or a prior alert time. For example, in order not to distract the driver with too many alerts, some types of alerts may be suppressed for a window of time before alerting again. In various embodiments, the alert suppression window may be defined by one or more of the following: the number of seconds of the distraction is detected prior to issuing an initial alert, the number of seconds to wait before issuing a repeat alert if distraction continues after an initial alert, the number of repeat alerts after which further repeats are silenced, the number of seconds during which a new initial alert of the same alert type cannot be issued after an initial or repeated alert is issued, and/or any other appropriate alert suppression criterion.

Figure 6:
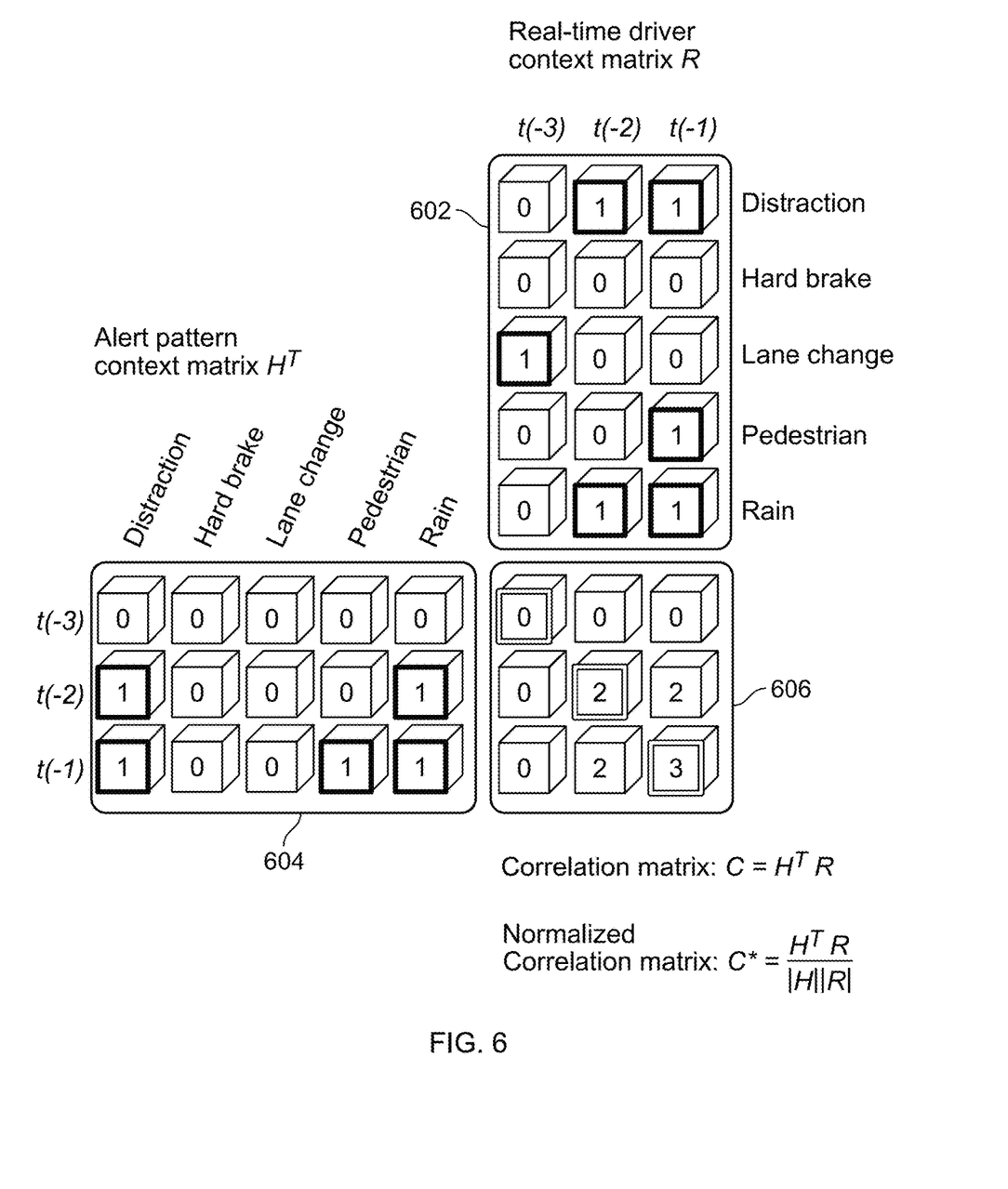
FIG. 6 shows an embodiment of a correlation matrix that results from a product of a real-time driver context matrix and an alert pattern context matrix.

FIG. 6 shows an embodiment of a correlation matrix that results from a product of a real-time driver context matrix and an alert pattern context matrix. In various embodiments, the correlation matrix 606 is correlation matrix C of FIG. 1, real-time driver context matrix 602 is real-time driver context matrix R of FIG. 1, and alert pattern context matrix 604 is the transpose of alert pattern context matrix H of FIG. 1. In the example shown, the first dimension of matrix R and matrix H indexes the event type (e.g., distraction, hard brake, lane change, pedestrian, rain, etc.) and the second dimension indexes the point in time the event type occurred (e.g., sample every second for the three seconds prior to time zero). In some embodiments, the elements of matrix R and H are either 0 or 1 where a 0 indicates no event occurred and a 1 indicates the presence of the event type at a particular point in time. In some embodiments, the elements of matrix R and H are probabilities where a value near 1 indicates a high probability of an event type occurring at a particular point in time.

In some embodiments, matrix C is an unnormalized matrix product $H^T R$. In some embodiments matrix C is normalized by the magnitude of H and R $$\left(\text{e.g., } C^* = \frac{H^T R}{|H||R|}\right).$$

In some embodiments, the correlation matrix is determined based at least in part on a machine learning model. For example, particular contexts in alert pattern context matrix H that led to high-risk events such as an accident or hard-braking event are learned from historical context data using a machine learning model or by reverse correlating high-risk events with the historical context data.

Figure 7:
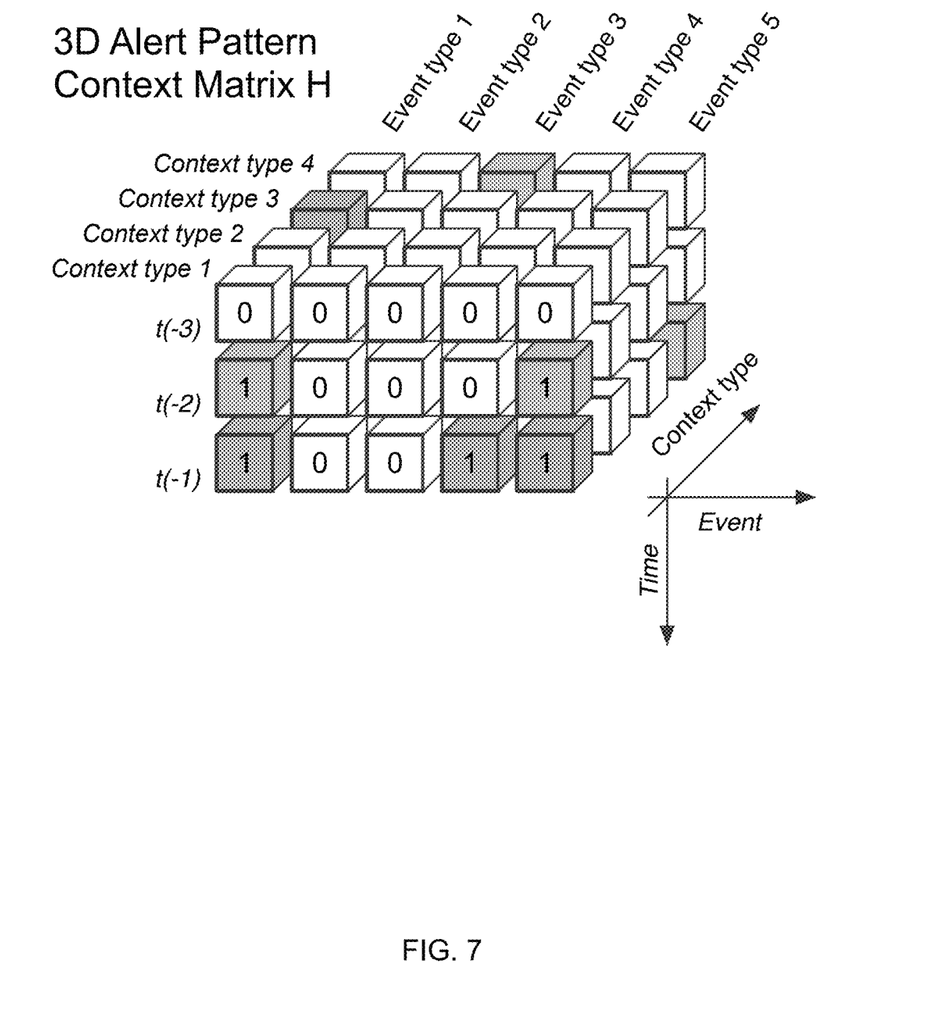
FIG. 7 shows an embodiment of a 3D alert pattern context matrix.

FIG. 7 shows an embodiment of a 3D alert pattern context matrix. In some embodiments, 3D alert pattern context matrix is alert pattern context matrix 112 of FIG. 1. In the example shown, the first dimension of 3D alert pattern context matrix H indexes the event type (e.g., distraction, hard brake, lane change, pedestrian, rain), the second dimension indexes the point in time the event type occurred (e.g., sample every second for the three seconds prior to time zero), and the third dimension indexes the context type (e.g., rainy construction zone, high-traffic curvy road, distraction followed by lane departure). In some embodiments, the elements of 3D alert pattern context matrix H are either 0 or 1 where a 0 indicates no event occurred and a 1 indicates the presence of the event type at a particular point in time for a particular context type. In some embodiments, the elements of 3D alert pattern context matrix H are probabilities where a value near 1 indicates a high probability of the presence of the event type at a particular point in time for a particular context type.

Figure 8:
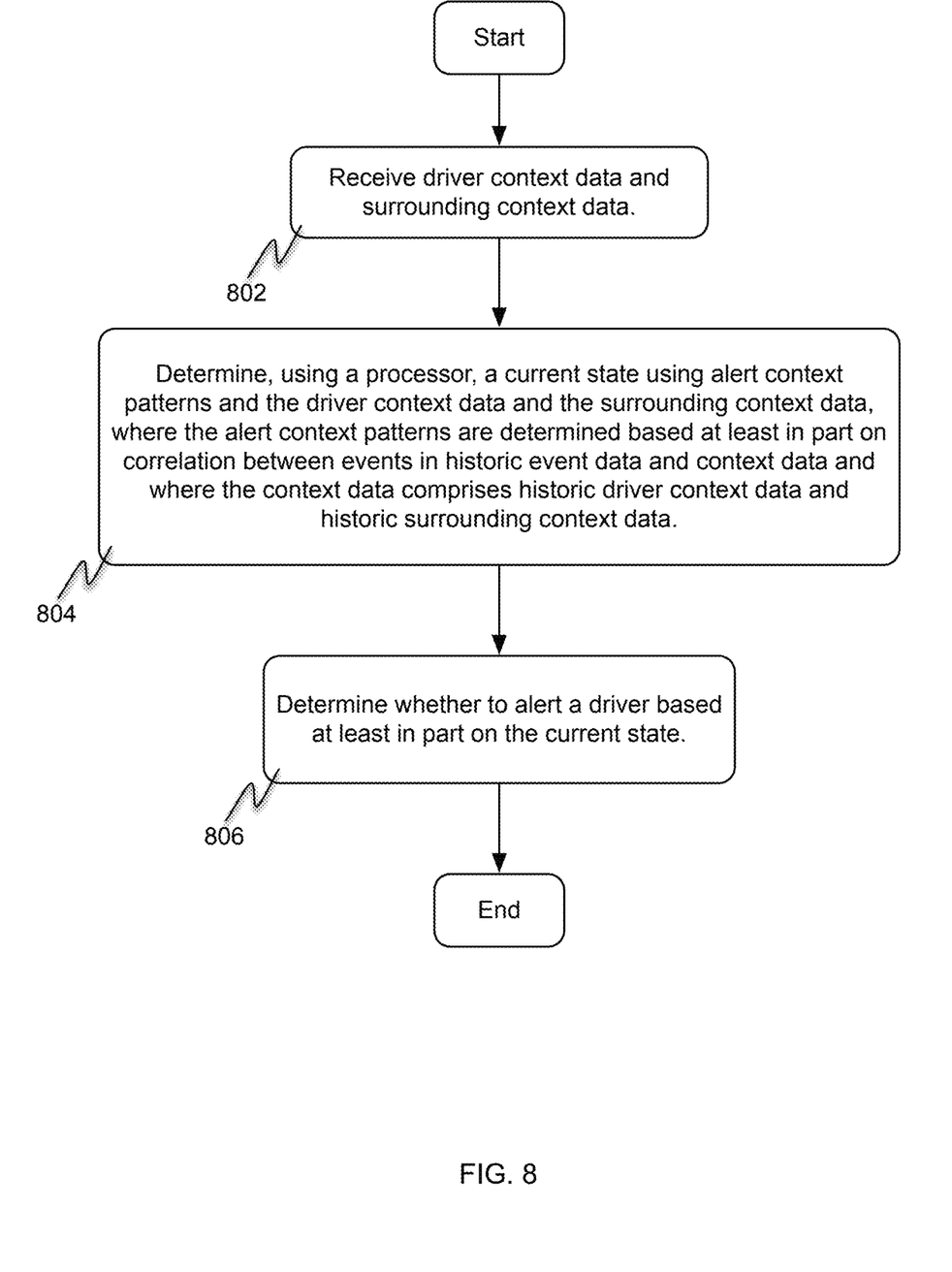
FIG. 8 is a flow diagram illustrating an embodiment of a system for context-based alerts.

FIG. 8 is a flow diagram illustrating an embodiment of a system for context-based alerts. In some embodiments, the process of FIG. 8 is executed by the system for context-based alerts of FIG. 2. In the example shown in 802, driver context data and surrounding context data is received. For example, real-time driver context and surrounding context data is received by a driver data interface and a real-time driver context matrix is generated. In some embodiments, real-time driver context matrix R includes information regarding driver events and the context in which they occurred. For example, the driver events comprise one or more of the following: distraction, hard-brake, lane-change, pedestrian, rain, sun, time of day, or any other appropriate context. In some embodiments real-time driver context matrix R is a Boolean matrix with one dimension indicating driver events, a second dimension indicating the time points in the past when the events occurred, and the Boolean elements indicating the presence of the event at a particular point in time.

In 804, a current state using alert context patterns and the driver context data and the surrounding context data is determined using a processor, where the alert context patterns are determined based at least in part on correlation between events in historic event data and context data and where the context data comprises historic driver context data and historic surrounding context data. For example, an alert state is generated based on a high degree of correlation between the real-time driver context data and the alert context patterns. The alert context patterns are based on historic context data associated with a risk event. In some embodiments, the alert context patterns may be determined by reverse correlating the historic context data with risk events. In some embodiments, the alert context patterns may be learned through machine learning algorithms.

In 806, whether to alert a driver based at least in part on the current state is determined. In some embodiments, determining whether to alert the driver is based at least in part on a prior alert type or a prior alert time. For example, if the current state of the system is in an alert state, in order not to distract the driver with too many alerts, some types of alerts may be suppressed for a window of time before alerting again.

Figure 9:
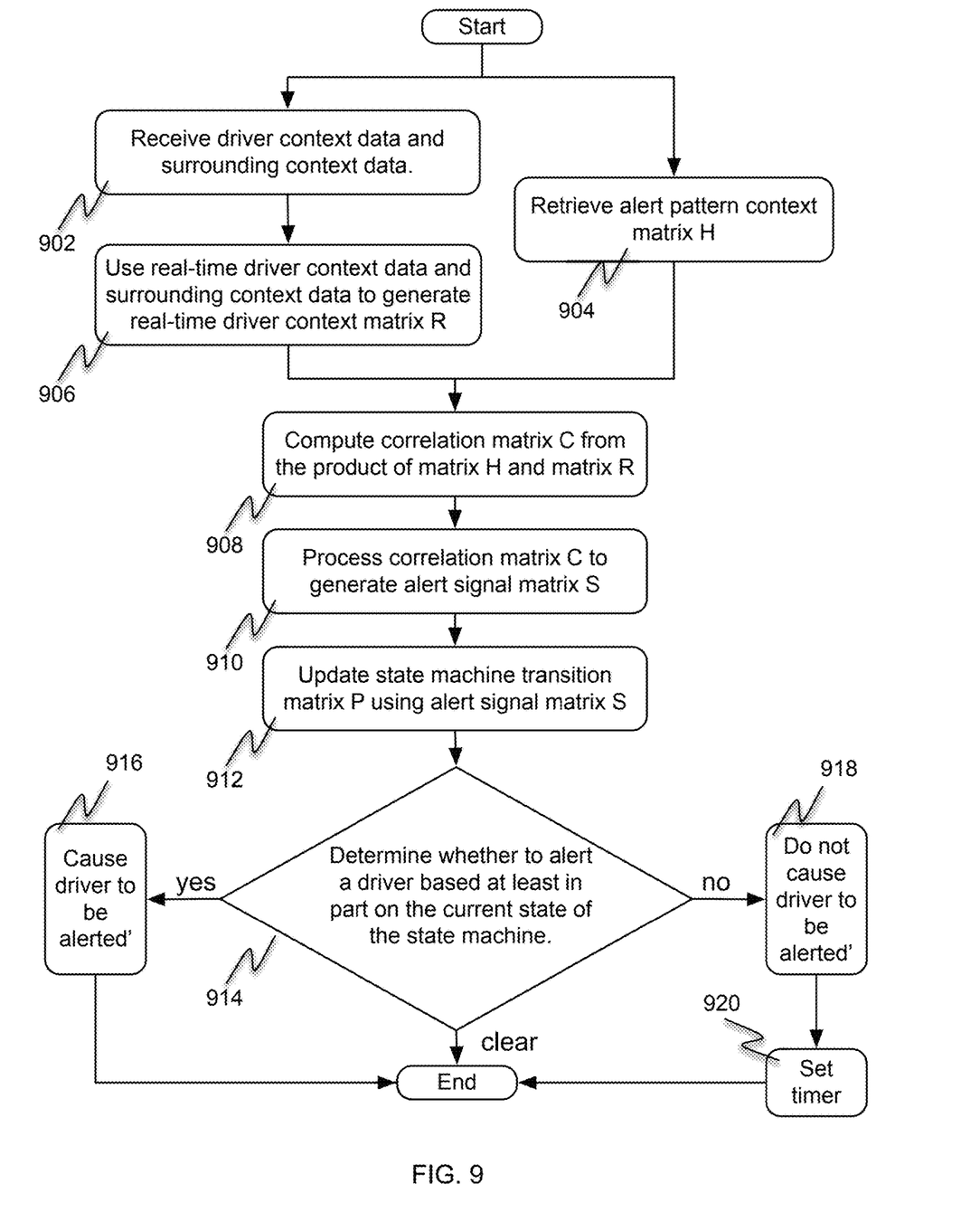
FIG. 9 is a flow diagram illustrating an embodiment of a context-driven alert generator.

FIG. 9 is a flow diagram illustrating an embodiment of a context-driven alert generator. In some embodiments, the process of FIG. 9 is executed by context-driven alert generator 100 of FIG. 1. In the example shown in 902, driver context data and surrounding context data is received. In 906, real-time driver context data and surrounding context data is used to generate real-time driver context matrix R and control is passed to 908. In some embodiments, real-time driver context matrix R is a Boolean matrix with one dimension indicating driver events, a second dimension indicating the time points in the past when the events occurred and the Boolean elements indicating the presence of the event at a particular point in time. For example, the elements of matrix R contain a 1 for time points where the driver was distracted by a cell phone and zero everywhere else. In some embodiments, real-time driver context matrix R is a matrix with one dimension indicating driver events, a second dimension indicating the time points in the past when the events occurred and the elements indicating the probability of the presence of the event at a particular point in time. For example, the elements of matrix R contain a value near 1 for time points where there was a high probability that the driver was distracted by a cell phone and zero everywhere else. In 904, alert pattern context matrix H is received and control is passed to 908.

In 908, correlation matrix C is computed from the product of matrix H and matrix R and control is passed to 910. In some embodiments, matrix C is normalized by the magnitude $$|H||R|\left(e.g., C^* = \frac{H^T R}{|H||R|}\right)$$

or any other appropriate normalization. In 910, correlation matric C* is processed to generate alert signal matrix S. In some embodiments, alert signal matrix S is a 1×N matrix where N is the number of alert signal types in alert pattern context matrix H, and the elements of S represent the probability of a match between the real-time driver context matrix R and a particular alert context type. In some various embodiments, the probability of a match is derived from the sum of the diagonal elements of the normalized correlation matrix C*, the weighted sum of the diagonal elements of the normalized correlation matrix C*, or any other appropriate similarity measure.

In 912, state machine transition matrix P is updated using alert signal matrix S. For example, state machine was in the 'clear' state and now alert signal matrix indicates a match of the real-time driver data to a potential risk event. As a result, the transition probability from state 'clear' to state 'alert' (e.g., $P_{ca}$) increases to near 1, reflecting a high probability of generating a driver alert on the next time cycle. In some embodiments, in the event that the probability is above a threshold, then an alert is issued.

In 914, whether to alert a driver based at least in part on the current state and the duration in the state of the state machine is determined. If it was determined that the driver is to be alerted, control passes to 916. If the alert criteria were met but it was determined that the driver is not to be alerted, control passes to 918. In 920, a timer is set to track how much time has passed since it was decided not to alert the driver. If system is in the clear state, the process ends. For example, in order not to distract the driver with too many alerts, some types of alerts may be suppressed for a window of time before alerting again. In some embodiments, determining whether to alert the driver is based at least in part on a prior alert type or a prior alert time.

Figure 10:
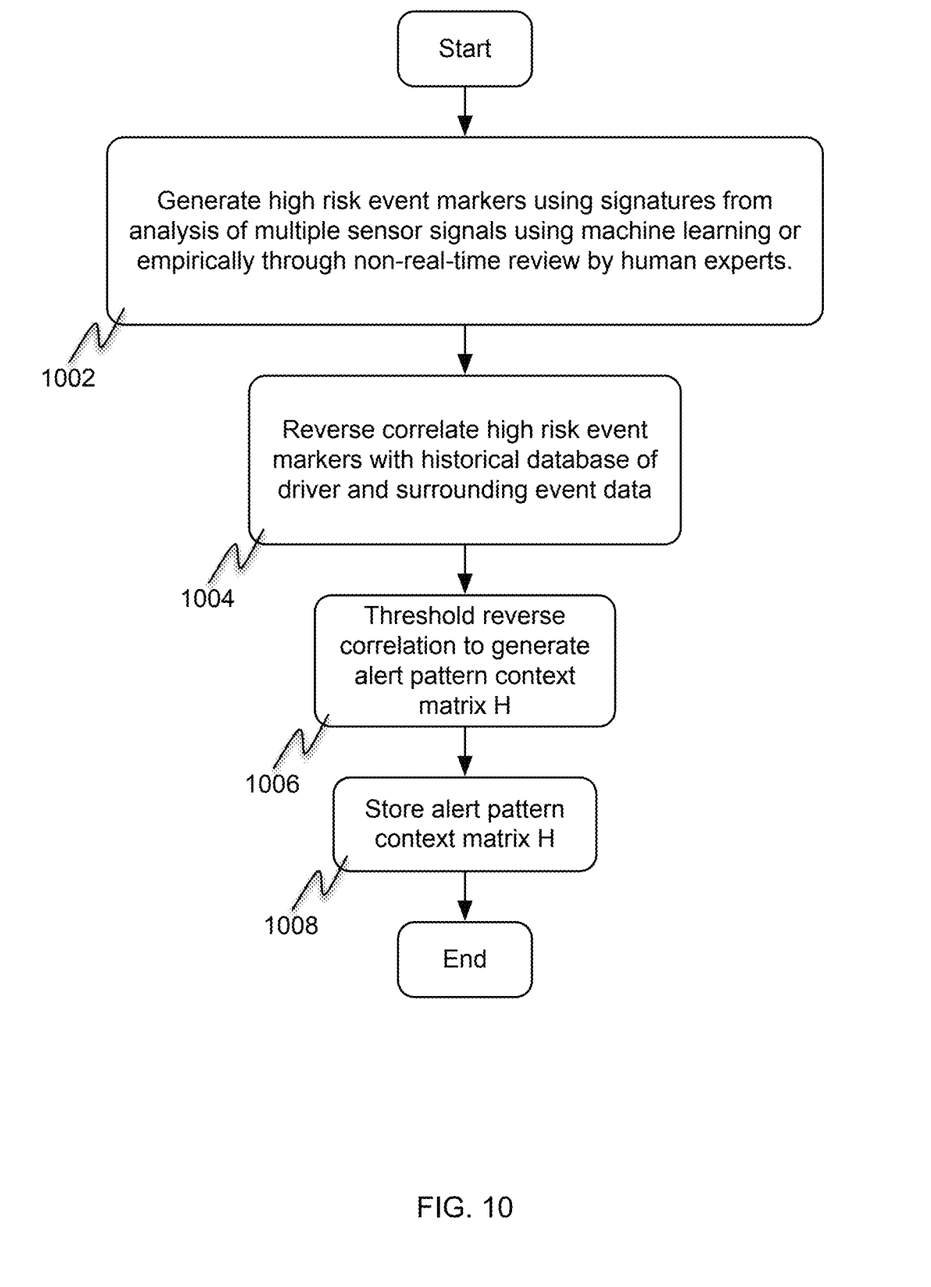
FIG. 10 is a flow diagram illustrating an embodiment of an alert context pattern processor.

FIG. 10 is a flow diagram illustrating an embodiment of an alert context pattern processor. In some embodiments, the process of FIG. 10 is executed by context-driven alert generator 110 of FIG. 1. In the example shown in 1002, high risk event markers using signatures from analysis of multiple sensor signals using machine learning or empirically through non-real-time review by human experts are generated. In various embodiments, the high-risk events comprise one or more of the following: hard brake, lane departure, collision, near-collision, roll-over, near roll-over, or any other appropriate high-risk event that could be potentially avoided using a driver alert prior to the event.

In 1004, high risk event markers are reverse correlated with historical database of driver and surrounding event data. For example, for N high-risk events i, the historical database of driver and surrounding event data is captured for a window of time as a context matrix Gi where the first-dimension indexes the event type and the second-dimension indexes the time samples. The set of N context matrices are then averaged to form the reverse correlation of the context with the high-risk events:

$$G^* = \frac{1}{N}\sum_{i=1}^{N} G_i.$$

In 1006, the reverse correlation G* is thresholded to generate a Boolean alert pattern context matrix H=θ[G*]. In some embodiments, the reverse correlation H=G* is not thresholded and the elements of H represent the probability of an event type at a particular time point in the risk-triggered average. In 1008, alert pattern context matrix H is stored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for context based alerts, comprising:
   an interface configured to:
      receive driver context data and surrounding context data;
   a processor configured to:
      determine a current state using an alert pattern context matrix and a real-time driver context matrix, wherein the real-time driver context matrix is determined based at least in part on driver context data and the surrounding context data, wherein the alert pattern context matrix is determined based at least in part on a reverse correlation of a high risk event marker with historic driver context data and historic surrounding context data, and wherein the alert pattern context matrix comprises a probability of a match to an event type at a time corresponding to a predetermined period of time preceding the high risk marker, wherein the probability of the match is a first probability of the match to the event type at a first time corresponding to a first predetermined period of time preceding the high risk marker, and wherein the alert pattern context matrix comprises a second probability of the match to the event type at a second time corresponding to a second predetermined period of time preceding the high risk marker; and determine whether to alert a driver based at least in part on the current state.

2. The system of claim 1, wherein the processor is further configured to determine a state machine based at least in part on the alert context patterns.

3. The system of claim 1, wherein the historic driver context data and the context data are based on data from an interior vehicle camera.

4. The system of claim 3, wherein the data from the interior vehicle camera is input to distraction models to generate distraction data.

5. The system of claim 4, wherein the distraction data comprises one or more of: a cell distraction, an eating distraction, a drinking distraction, a smoking distraction, a seat belt distraction, and/or a drowsy distraction.

6. The system of claim 1, wherein the historic surrounding context data and the surrounding context data are based on data from an exterior vehicle camera.

7. The system of claim 6, wherein the data from the exterior vehicle camera is input to vision systems to generate exterior context detected data.

8. The system of claim 7, wherein the exterior context detected data comprises one or more of: a detected traffic data, a detected traffic speed data, a detected curvy road data, a detected straight road data, a detected flat road data, a detected hilly road data, a detected incline road data, a detected decline road data, a detected traffic light data, a detected stop sign data, a detected pedestrian data, a detected cyclist data, a detected weather data, and/or a detected lane departure data.

9. The system of claim 1, wherein the event data are determined using a vehicle event recorder and/or vehicle event recorder sensors.

10. The system of claim 9, wherein the event data comprises one or more of: a hard braking event, an accelerometer event, a near collision event, a hard cornering event, a rollover stability event, an anti-lock braking event, and/or an accident event.

11. The system of claim 1, wherein the correlation is determined based at least in part on a machine learning model.

12. The system of claim 1, wherein determining whether to alert the driver is based at least in part on time or frequency associated with the driver context data, the surrounding context data, and/or the current state.

13. The system of claim 1, wherein determining whether to alert the driver is based at least in part on a client preference for alerts.

14. The system of claim 1, wherein determining whether to alert the driver is based at least in part on a prior alert type or a prior alert time.

15. The system of claim 1, wherein determining a current state is based at least in part on a state machine, wherein the state machine transitions are determined based at least in part on the alert pattern context matrix and the real-time driver context matrix.

16. The system of claim 15, wherein the state machine transitions are based at least in part on processing of a correlation matrix derived by multiplying the alert pattern context matrix and the real-time driver context matrix.

17. The system of claim 1, wherein the historic surrounding context data includes historic weather data.

18. The system of claim 1, wherein the historic surrounding context data includes historic accident data and/or historic traffic data.

19. The system of claim 1, wherein the high risk event marker is generated using one or more of: signatures from an analysis of multiple sensor signals using machine learning and empirically through non-real-time review by human experts.

20. The system of claim 1, wherein the high-risk event marker is associated with one or more of a hard brake, a lane departure, a collision, a near-collision, a roll-over, a near roll-over, and an event avoidable with a driver alert prior to the event.

21. A method for context based alerts, comprising:
receiving driver context data and surrounding context data;
determining, using a processor, a current state using an alert pattern context matrix and a real-time driver context matrix, wherein the real-time driver context matrix is determined based at least in part on driver context data and the surrounding context data, wherein the alert pattern context matrix is determined based at least in part on a reverse correlation of a high risk event marker with historic driver context data and historic surrounding context data, and wherein the alert pattern context matrix comprises a probability of a match to an event type at a time corresponding to a predetermined period of time preceding the high risk marker, wherein the probability of the match is a first probability of the match to the event type at a first time corresponding to a first predetermined period of time preceding the high risk marker, and wherein the alert pattern context matrix comprises a second probability of the match to the event type at a second time corresponding to a second predetermined period of time preceding the high risk marker; and
determining whether to alert a driver based at least in part on the current state.

22. A computer program product for context based alerts, the computer program product being embodied in a non-transitory computer readable storage medium and comprising computer instructions for:
receiving driver context data and surrounding context data;
determining, using a processor, a current state using an alert pattern context matrix and a real-time driver context matrix, wherein the real-time driver context matrix is determined based at least in part on driver context data and the surrounding context data, wherein the alert pattern context matrix is determined based at least in part on a reverse correlation of a high risk event marker with historic driver context data and historic surrounding context data, and wherein the alert pattern context matrix comprises a probability of a match to an event type at a time corresponding to a predetermined period of time preceding the high risk marker, wherein the probability of the match is a first probability of the match to the event type at a first time corresponding to a first predetermined period of time preceding the high risk marker, and wherein the alert pattern context matrix comprises a second probability of the match to the event type at a second time corresponding to a second predetermined period of time preceding the high risk marker; and determining whether to alert a driver based at least in part on the current state.

* * * * *